(12) United States Patent
Chiang

(10) Patent No.: US 6,443,543 B1
(45) Date of Patent: Sep. 3, 2002

(54) MOBILE PERSONAL COMPUTER

(76) Inventor: Wayne Chiang, 215 Manor Rd., Douglaston, NY (US) 11363

( * ) Notice: Subject to any disclaimer, the term of this patent is extended or adjusted under 35 U.S.C. 154(b) by 0 days.

(21) Appl. No.: 09/827,867

(22) Filed: Apr. 6, 2001

(51) Int. Cl.⁷ .............................................. A47B 97/00

(52) U.S. Cl. ................. 312/223.3; 312/312; 312/319.7; 180/65.1

(58) Field of Search .......................... 312/319.5, 319.7, 312/319.8, 249.1, 249.8, 249.13, 209, 237, 223.3, 312; 108/147, 147.19; 180/6.5, 167, 65.1; 701/1, 23

(56) References Cited

U.S. PATENT DOCUMENTS

| | | | |
|---|---|---|---|
| 3,117,392 A | * 1/1964 | Junkunc | 108/147.19 X |
| 4,807,712 A | 2/1989 | Skottegard | |
| 5,161,868 A | * 11/1992 | Hooser | 312/312 X |
| 5,350,033 A | 9/1994 | Kraft | |
| 5,440,216 A | 8/1995 | Kim | |
| 5,465,525 A | 11/1995 | Mifune et al. | |
| 5,570,992 A | 11/1996 | Lemelson | |
| 5,758,298 A | 5/1998 | Guldner | |
| 5,806,943 A | * 9/1998 | Dell et al. | 312/223.3 |
| 5,819,863 A | 10/1998 | Zollinger et al. | |
| 5,944,132 A | 8/1999 | Davies et al. | |
| 6,000,770 A | * 12/1999 | Frich | 312/319.7 |
| 6,102,497 A | * 8/2000 | Ehr et al. | 312/209 |
| 6,119,057 A | 9/2000 | Kawagoe | |

FOREIGN PATENT DOCUMENTS

BE 696316 * 6/1960 ............. 312/319.5

* cited by examiner

Primary Examiner—James O. Hansen
(74) Attorney, Agent, or Firm—Michael I. Kroll

(57) ABSTRACT

A mobile personal computer station having an upper table top 32 to which is attached a computer 14 being connected to a lower docking station 28 by multiple extendable legs 30. The purpose of the present invention 10 is to provide a computer control wheeled structure that can move about as the user 12 chooses. The upper tabletop 32 also has attached thereto a rotatable camera which can be mounted in a plurality of cable and accessory management apertures 40 which are spaced about the tabletop. The lower docking station 28 is provided with wheels 24, 26 and is electrically driven by drive wheels 26 which are controlled by a computer. The camera rotator mechanism is also computer controlled and comprises a transceiver integrated circuit 82, a motor 84, a worm gear 86, a drive transfer gear 88, a drive shaft 90 and a rotative coupling post 60 which attaches the camera rotating mechanism to the tabletop 32. A camera platform 92 and camera locking screw 94 are provided for attaching a camera thereto. The docking station 28 is-provided with storage compartments 44 and a hardware port 53 whereupon a computer and related hardware can be placed. The lower mobile unit 54 comprises an integrated circuit housing 68, a mobilizer CPU 120, a clutch-driven motor 62, a plurality of shock absorbers 56, a servomotor drive motor control mechanism 128, a drive shaft 118, a drive gear 64, a differential gear 66, drive wheels 26 and castor wheels 24 and a plurality of electrical wiring and contacts 72.

15 Claims, 16 Drawing Sheets

MOBILE PERSONAL COMPUTER

BACKGROUND OF THE INVENTION

1. Field of the Invention

The present invention relates generally to a computer controlled mobile device and, more specifically, to a mobile personal computer station comprising a personal computer and a motorized workstation.

The motorized workstation has a base member, planar worksurface and a plurality of extension members for adjusting the height of the planar worksurface. The planar worksurface has a rotative threaded aperture wherein a stanchion with means for attaching a camera thereto. Located on the underside of the planar worksurface is the electrical and mechanical means for controlling the tilt and pan of the camera which has a connection to the personal computer for recording and or transmitting the image within the focal field of the camera.

The camera stanchion and the planar worksurface extension members can be selectively height adjusted to suit the user.

The base member of the motorized workstation houses the electrical and mechanical elements whereby the workstation can be instructed to move from one location to another by means of the personal computer. The base member has an internal remotely regenerative power supply in the form of at least one battery. There are also a number of wheels supporting the base member. The wheels are connected to a servomotor that is controlled by an integrated circuit that receives directional commands from the personal computer. The integrated circuit also controls the engaging and disengaging of the drive motor. Also forming an integral part of the base member is a connection panel for attachment of various computer controlled components such as, mouse, keyboard, monitor, printer, camera, etc. this is basically a pass through panel to the personal computer.

The present invention is a wheel top, PC mobilizer. The wheel top, PC mobilizer is comprised of a table top, a plurality of selectively extendible table legs having locking and retaining means, and a docking station. The tabletop is a flat rectangular shaped structure that provides the same functioning aspect of a conventional tabletop found in industry. The tabletop is furnished with a camera stand, and a camera rotator mechanism. The camera stand is a circled shape structure having a selectively extendible leg. The camera stand provides the means of rest for a camera that is selectively attached thereto. The camera extension leg is comprised of two cylindrical shaped structures that are telescopically coupled together. The camera stand selectively extendible leg is furnished with two extension joints and extension joint retainers. The camera stand selectively extendible leg provides the user of the wheel top, PC mobilizer with the means of selectively adjusting the height of a camera that has been mounted onto the camera stand. The extension joints of the camera stand are coupled together in a telescoping manner as to provide the means of a smooth extension transgression as the camera stand extension leg is selectively extended. The extension joint retainers provide the means for selectively retaining the camera stand extension leg in the extended position. The camera rotator mechanism 80 is a computer controlled unit that provides the user 12 of the wheel top, PC mobilizer 10 with the means for selectively rotating a camera that is mounted onto the telescoping camera stand 20 and that has been coupled to the table top 32 via the camera rotative coupling mounting post 60. The camera rotator mechanism 80 is composed of a transceiver IC 82, a motor 84, a worm gear 86, a drive transfer gear 32, a drive shaft 90, and a rotative coupling 60. The transceiver IC 82 is a closed circuit receiver and transmitter that provides the means for the positioning and relaying data information about the circular displacement position of a camera mounted onto the camera stand 20 of the wheel top, PC mobilizer. The motor 84 resembles that of a small conventional drive motor that is commonly found in industry. The motor provides the means for rotating the camera mounted on the camera stand via information received from the transceiver IC 82. The worm gear 86 and the drive transfer gear 88 resemble that of a worm gear and drive component commonly found in industry, and work in conjunction with the motor 84 and the camera drive shaft 90 to deliver circular displacement to a camera that has been selectively mounted to the camera stand 20 of the wheel top, PC mobilizer. The rotative coupling 60 is a circular shaped structure that protrudes through the tabletop 32. The rotative coupling 60 provides the means for coupling and retaining the camera stand to the tabletop 32 of the wheel top, PC mobilizer. Also shown are a camera platform 92, a camera locking screw 94, electrical wires 72, a battery 96, an antenna 98 and mounting recesses 40.

Another object of the wheel top, PC mobilizer are the extendible table legs. There are four extendible table legs located at each distal corner of the tabletop bottom most side. The extendible table legs is comprised of variable diameter cylindrical joint structures that are telescopically coupled together having extension joint retainers thereto. The extendible table legs provides the user of the wheel top, PC mobilizer with the means of selectively adjusting the height of the tabletop.

The docking station is a modified rectangular shaped structure having a computer controlled mobility via wheels and a drive motor, and is also furnished with a plurality of hardware ports. The docking station is comprised of an upper housing, a battery vent, a storage access panel, a mobile unit and a plurality of hardware ports. The upper housing provides the housing means for several of the intricate components that help to comprise the wheel top, PC mobilizer. The upper housing houses and consists of two internal batteries, a PC interface, storage compartments, a plurality of hardware ports and table leg recesses. The internal batteries may resemble and function like that of convention rechargeable batteries commonly found in industry. The internal batteries provide the means for powering the mobilizer CPU and drive motor when the wheel top, PC mobilizer is not selectively attached to a utility power source. The PC interface may be a rectangle shaped structure furnished with a plurality of variable computer connection ports. The PC interface provides the means for the user's computer to interface and communicate with the CPU of the wheel top, PC mobilizer. The PC interface is also furnished with an AC current connector that provides the means for selectively attaching the wheel top, PC mobilizer to a utility power source via a conventional extension power cord that may be found in industry. The storage compartments are flanged cut out furnished into the upper housing that provides a means for selectively storing intricate components of the user's choice. The hardware ports are molded cut out furnished into the upper housing that provides for the means of selectively storing computer hardware items (i.e. CPU towers, printers, and other peripheral of the user's choice). The table leg recesses are circular shaped apertures that provide means for coupling the extendible table legs to the upper housing. The battery vent is a molded structure having rectangular shaped apertures therein that provides the means for ventilating the batteries that are housed within the upper housing. The storage access panel is a rectangle shaped structure that provides the means for selectively retaining or obtaining components within the storage compartments.

The mobile unit is a computer controlled wheeled structure that provides the means of mobility for the wheel top, PC mobilizer. The mobile unit consists of a IC housing, a mobilizer CPU, a clutch driven motor, a plurality of shock absorbers, a servo-motor, steering rods, a drive shaft, a drive gear, a differential gear, rear wheels, front wheels and a plurality of electrical wiring contacts. The IC housing is an electrically shielded structure that houses the mobilizer CPU. The IC housing provides the means for protecting the mobilizer CPU from inadvertent electrical or static discharge that may render the mobilizer CPU inoperable. The mobilizer CPU is a closed circuit electronic device that provides the means for monitoring the drive functions of the mobile unit as well as the circular displacement of the rotator camera drive shaft mechanism. The clutch driven motor resembles that of a conventional clutch driven motor commonly found in industry. The clutch driven motor provides the means for selectively engaging the drive components within the motor to enable motion. The clutch driven motor unless activated allows for the mobile unit to move freely with no gearing. The plurality of shock absorbers may be furnished to resemble and function like that of conventional shock absorbers commonly found in industry. The plurality of shock absorbers may be placed into appropriate positions, as they seem fit to absorb unwanted shock that may occur as the mobile unit propels the wheel top, PC mobilizer. The servomotor may resemble and function like that of a servo-motor commonly found in industry. The servomotor works in conjunction with the steering rods to provide the means for steering the wheel top, PC mobilizer via the front wheels. The steering rods are thin cylindrical structures that couple the servomotor to the front wheels to provide the means for controlled steering via the servomotor. The drive gear, the differential gear and the drive shaft may be furnished to resemble and function like that of conventional gears and shafts commonly found in industry. The drive shaft, differential gear and drive gear work in conjunction with the clutch driven motor to provide the means of linear mobility for the wheel top, PC mobilizer. The electrical wiring contacts provides the means for electrically coupling several of the electronic and voltage dependant components that are housed within the wheel top, PC mobilizer.

2. Description of the Prior Art

There are other computer controlled mobile device designed for various electronic advancement and industry worthy causes. Typical of these is U.S. Pat. No. 6,119,057 issued to Kawagoe on Sep. 12, 2000.

Another patent was issued to Davis et al. on Aug. 31, 1999 as U.S. Pat. No. 5,944,132. Yet another U.S. Pat. No. 5,819,863 was issued to Zollinger et al. on Oct. 13, 1998 and still yet another was issued on May 26, 1998 to Guldner as U.S. Pat. No. 5,758,298. Yet another U.S. Pat. No. 5,570,992 was issued to Lemelson on Nov. 5, 1996.

Another patent was issued to Kim on Aug. 8, 1995 as U.S. Pat. No. 5,440,216. Yet another U.S. Pat. No. 5,350,033 was issued to Kraft on Sep. 27, 1994. Another was issued to Skottegard on Feb. 28, 1989 as U.S. Pat. No. 4,807,712 and still yet another was issued on Aug. 14, 1984 to Yoshimura et al. as U.S. Pat. No. 4,465,525.

U.S. Pat. No. 6,119,057

Inventor: Nobukazu Kawagoe

Issued: Sep. 12, 2000

An autonomous vehicle which permits a work area to be set without requiring the operator to input a numerical value includes a body, a travel unit for moving said body, a distance measurement unit for measuring the distance from the body to a wall, and a travel control unit for determining a work area depending upon the distance output from the distance measurement unit at the start of operation and controlling the travel unit to travel the body within the determined work area. Note that a method of controlling the traveling of such an autonomous vehicle is claimed as well.

U.S. Pat. No. 5,944,132

Inventor: Ronald C. Davies

Issued: Aug. 31, 1999

A robotic golf caddy apparatus (21) movably supported on a steering assembly (28) and including a communications assembly (41) for communicating with a G.P.S. system (61) and a central control station in order to guide and steer the apparatus around designated accessible areas of a golf course. The apparatus (21) also includes a dead reckoning system with distance determination device (83) and compass (85) for determining the distance the caddy travels should the communications assembly (41) lose communications with a predetermined minimum number of satellites in the G.P.S. system (61). Also, a sensor (72a) is provided for detecting a guide tape or line (126,130), provided in preselected areas of the golf course. The caddy apparatus (21) is steered along the guide tape (126,130), rather than by the G.P.S. system (61), in certain areas of the course where the G.P.S. system (61) may be inadequate for maximum safe operation of the caddy apparatus.

U.S. Pat. No. 5,819,863

Inventor: W. Thor Zollinger

Issued: Oct. 13, 1998

A vehicle for carrying an object of interest across a supporting surface including a frame having opposite first and second ends; a first pair of wheels fixedly mounted on the first end of the frame; a second pair of wheels pivotally mounted on the second end of the frame; and a pair of motors borne by the frame, each motor disposed in driving relation relative to one of the pairs of wheels, the motors propelling the vehicle across the supporting surface.

U.S. Pat. No. 5,758,298

Inventor: Jurgen Guldner

Issued: May 26, 1998

In an autonomous navigation system for a mobile robot or a manipulator which is intended to guide the robot through the work space to a predetermined target point in spite of incomplete information without colliding with known or unknown obstacles. All operations are performed on the local navigation level in the robot coordinate system. In the course of this, occupied and unoccupied areas of the workspace are appropriately marked and detected obstacles are covered by safety zones. An intermediate target point is defined in an unoccupied area of the workspace and a virtual harmonic potential field is calculated, whose gradient is followed by the robot. Mobile robots with such an autonomous navigation system can be used as automated transport, cleaning and service systems.

U.S. Pat. No. 5,570,992

Inventor: Jerome H. Lemelson

Issued: Nov. 5, 1996

An automatic, controlled manipulator includes a moveable tool head on an arm and a tool supported at the end of the arm. The manipulator may be moveable in multiple or all directions. A storage for remotely generated control signals can be accessed to control motors causing 3D motion of the tool head, attachment of the tool, and (if applicable) motion of the manipulator, and also to control power to operate the tool. Video signals generated at the manipulator are used to identify the work piece, to select one of a plurality of stored control programs, and to select the tool operations applied.

U.S. Pat. No. 5,440,216

Inventor: Tae-Sig Kim

Issued: Aug. 8, 1995

A self moving robot cleaner capable of moving to an automatic charging unit to charge its battery when a charging voltage of the battery is decreased to below a predetermined level during a cleaning operation and then again carrying out the cleaning operation. The robot cleaner has a cleaner body, a suction unit provided in the cleaner body for sucking dirt on a floor, a navigation sensor positioned at an upper portion of the cleaner body for sensing a distance to and a direction of an obstacle and for outputting a distance sensing signal and a direction sensing signal, a driving unit positioned at a lower portion of the cleaner body for moving the cleaner body in a moving direction, and a control unit for determining a cleaning area and a moving direction in response to the distance sensing signal and the direction sensing signal from the navigation sensor and outputting a control signal to move the cleaner body and a control signal to drive the suction unit.

U.S. Pat. No. 5,350,033

Inventor: Brett W. Kraft

Issued: Sep. 27, 1994

A remotely controllable robotic inspection vehicle includes a fixed housing which can accommodate a number of modular inspection and/or robotic arm components. The base unit includes two drive and two free castering wheels arranged in an independently articulating configuration which insures that at least three of the wheels are in a supporting position at all times and that the drive wheels always have traction. Thus, when small objects, such as construction debris, uneven floors, etc., are encountered, the vehicle easily traverses them with no danger of tipping or loss of traction. The two drive wheels are independently powered, which permits the vehicle to be rotated in a very small confined space about the same diameter as the width of the vehicle. A centrally mounted, modular telescoping camera assembly includes a camera that can be raised and lowered as well as rotated in the vertical and horizontal planes and/or a modular robotic arm. The vehicle can be lowered into remote areas, such as underground transformer housings, etc. to perform inspections and repairs.

U.S. Pat. No. 4,807,712

Inventor: Christopher Skottegard

Issued: Feb. 28, 1989

A self-propelled table for carrying and/or lifting/lowering objects for invalid people having a hollow plastic upper enclosure which is padded at the edges and upon the surface of which contains anti-slip recesses and joystring assembly. The lower portion of this assemblage is attached to a vertically mounted, telescoping tubular assembly which may be either fixed or supplemented with a motor-power assembly with which to adjust the height-away-from-the-floor of the uppermost serving surface. The bottom of the tubular assembly is attached to the upper portion of a hollow plastic lower enclosure which contains wheels, motors, batteries, and electronic circuits to translate the electronic signals from the joystring into meaningful wheel motions. Pulling the free end of the joystring causes the invention to propel itself and it's load in the same direction that the joystring was pulled; thereby providing handicapped people with the ability to perform simple tasks unassisted.

U.S. Pat. No. 4,465,525

Inventor: Hirofumi Yoshimura

Issued: Aug. 14, 1984

A ferritic stainless steel having excellent formability, for example, in a deep drawing procedure, contains 0.04 to 0.1 weight % of C, 1.0 weight % or less of Si, 0.75 weight % or less of Mn, 10 to 30 weight % of Cr, 0.5 weight % or less of Ni, 0.025 weight % or less of N, 2 to 30 ppm of boron, and optionally, 0.005 to 0.4 weight % of an additional alloy component consisting of Al and, further optionally, a further additional alloy component consisting of at least one member selected from 0.005 to 0.6 weight % of Ti, 0.005 to 0.4 weight % of Nb, V, and Zr, 0.02 to 0.50 weight % of Cu, and 0.05 weight % or less of Ca and Ce, the sum of the contents of C and N being 0.0502 weight % or more.

While these computer-controlled devices may be suitable for the purposes for which they were designed, they would not be as suitable for the purposes of the present invention, as hereinafter described.

SUMMARY OF THE PRESENT INVENTION

The present invention discloses a mobile personal computer station having an upper table top to which is attached a computer being connected to a lower docking station by multiple extendable legs. The purpose of the present invention is to provide a computer controlled wheeled structure whereby the present invention can move about as the user chooses. The upper tabletop also has attached thereto a rotatable camera which can be mounted in a plurality of cable and accessory management apertures which are spaced about the tabletop. The lower docking station is provided with wheels and is electrically driven by drive wheels which are controlled by a computer. The camera rotator mechanism is computer controlled and comprises a transceiver integrated circuit, a motor, a worm gear, a drive transfer gear, a drive shaft and a rotative coupling which attaches the camera rotating mechanism to the tabletop. A camera platform and camera locking screw are provided for attaching a camera thereto. The docking station is provided with storage compartments and a housing port whereupon a computer and related hardware can be placed. The lower mobile unit comprises an integrated circuit housing, a mobilizer CPU, a clutch-driven motor, a plurality of shock absorbers, a servomotor drive motor control mechanism, a drive shaft, a drive gear, a differential gear, drive wheels and castor wheels and a plurality of electrical wiring contacts. Additionally, shock absorbers are also provided.

A primary object of the present invention is to provide computer controlled mobile device that may accommodate various computer hardware devices commonly found in industry.

Another object of the present invention is to provide computer controlled mobile device that may reduce the unnecessary bulkiness of the common desktop PC.

Yet another object of the present invention is to provide computer controlled mobile device that may enable PC's to be available in locations such as living rooms, dining rooms, parks, etc.

Still yet another object of the present invention is to provide computer controlled mobile device that may overcome the anemic power of traditional laptop PC's.

Yet another object of the present invention is to provide computer controlled mobile device that may compete with traditional R/C by introducing wireless Ethernet and Internet technology.

Additional objects of the present invention will appear as the description proceeds.

The present invention overcomes the shortcomings of the prior art by providing a computer controlled mobile device that is compact, may have geared or free wheel mobility. Furthermore it may provide the means for a selectively height adjustable table element. Yet further the computer controlled mobile devices may be furnished with a series of computer interface connections that may provide as a means for device and computer interfacing and communications.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
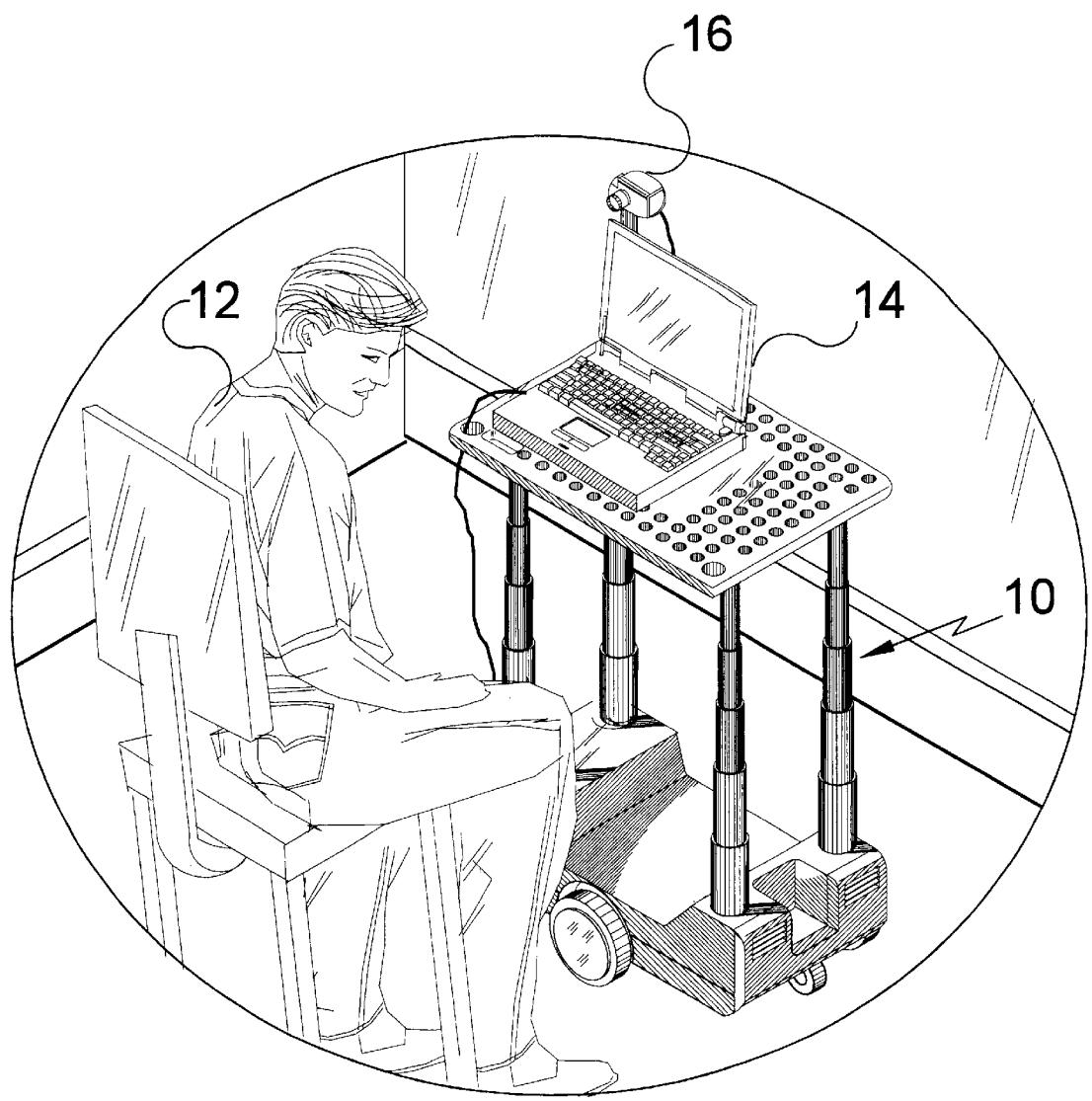
FIG. 1 is perspective view, shown is the present invention. Also shown is an individual utilizing a personal laptop computer as it is selectively attached to the wheel top, PC mobilizer. Shown also is the size relations of the wheel top, PC mobilizer as it relates to the individual utilizing the wheel top, PC mobilizer. Also shown is a digital camera and a laptop as they are attached and in rest on the wheel top, PC mobilizer.

With regard to reference numerals used, the following numbering is used throughout the drawings.

10 present invention
12 user
14 lap top computer
16 digital camera
18 camera rotative coupling
20 camera shaft
22 battery vent panel
24 caster wheel
26 drive wheel
28 docking station
30 extendable legs
32 table top
34 internal battery
36 AC power port charging means
38 upper housing
40 cable and accessory management apertures
42 PDA and cell phone docking station
44 storage compartment
46 storage compartment access panel
48 PC interface
50 PC interface access panel
52 hardware devices
53 hardware port
54 mobile unit
56 shock absorber
58 leg recesses
60 camera mounting post
62 motor
64 drive gear
66 differential gear
68 IC housing
70 alternate position of PC interface
72 electrical wiring
74 user changeable gear
78 suspension spring
80 camera rotator mechanism
82 transceiver IC
84 motor
86 worm gear
88 drive transfer gear
90 drive shaft
92 camera platform
94 camera locking screw
96 camera mechanism battery
98 antenna
100 AC power port
102 power status LEI)
104 cable port
106 CAT-5 port
108 firewire port
110 DB-25 port
112 USB port
114 unlocked retaining member
116 locked retaining member
118 drive shaft
120 mobilizer CPU unit
122 modulator
124 local oscillator
126 opamp
128 servomotor
130 demodulator
132 filter circuit
134 divide by circuit
136 summing junction
138 motor driven circuit
140 position sensor
142 comparator
144 transceiver
146 antenna

DESCRIPTION OF THE PREFERRED EMBODIMENT(S)

In order that the invention may be more fully understood, it will now be described, by way of example, with reference to the accompanying drawings in which FIGS. 1 through 16 illustrate the present invention being a mobile personal computer.

Turning to FIG. 1, shown therein is a perspective view, showing the present invention 10. Also shown is an individual 12 utilizing a personal laptop computer 14 as it is selectively attached to the wheel top, PC mobilizer of the present invention 10. Shown also is the size relations of the wheel top, PC mobilizer as it relates to the individual 12 utilizing the wheel top, PC mobilizer 10. Also shown is a digital camera 16 and a laptop computer 14 as they are attached to and rest on the wheel top, PC mobilizer 10.

Figure 2:
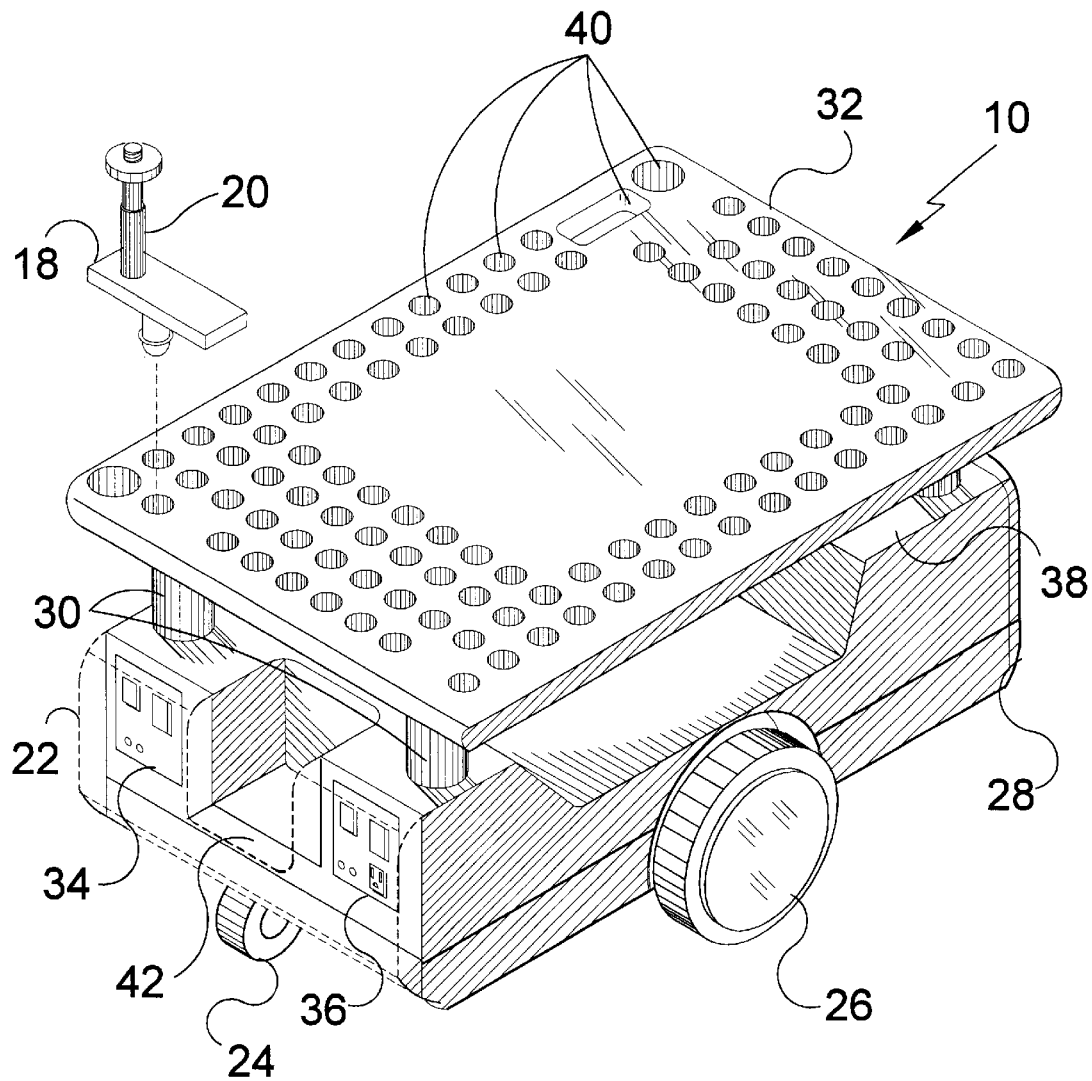
FIG. 2 is a perspective view, shown is the displacement relations between several of the components that comprise the wheel top, PC mobilizer. Shown also is the mating relations between the camera rotative coupling and the camera stand. Also shown is the internal battery vents as they relate to the front most hardware port. Shown also is the ideal shape and structure of the wheel top, PC mobilizer as it seems fit.

Turning to FIG. 2, shown therein is a perspective view, showing the displacement relations between several of the components that comprise the present invention 10. Shown also is the mating relations between the camera rotative coupling 18 and the extendable camera stand 20. Shown also is the ideal shape and structure of the wheel top, PC mobilizer. Another object shown is the front caster wheel 24 and drive wheels 26 as they relate to the docking station 28. Yet another object shown is the displacement relations of the extendible legs 30 as they relate to the table top 32 as well as the docking station 28. Shown also (represented in phantom lines) is the battery vent panel 22 as it relates to the internal battery 34 and the internal battery having an AC power port charging coupling 36 as well as the upper housing 38. Also shown are multiple cable recesses or apertures 40 and the PDA and cell phone docking station 42.

Figure 3:
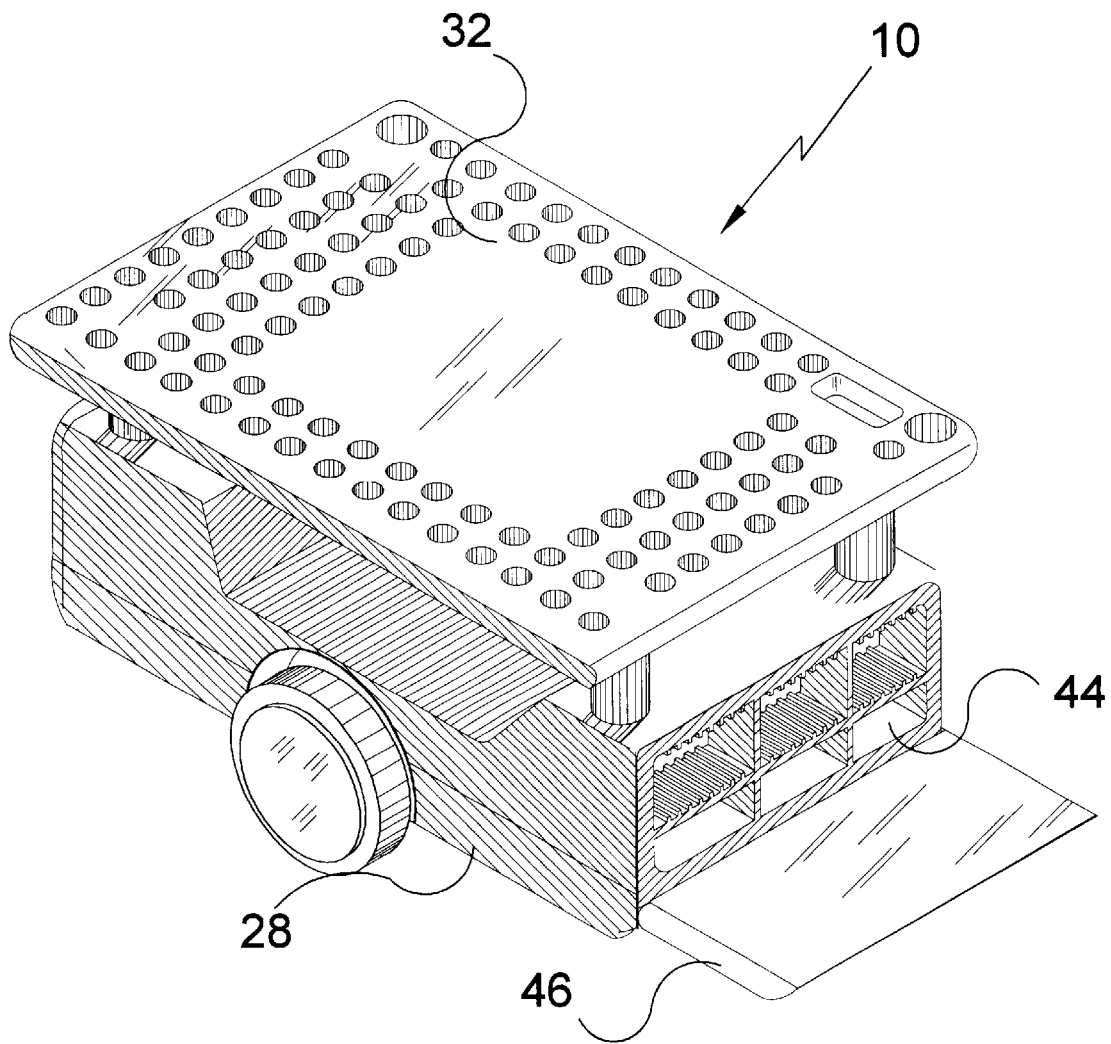
FIG. 3 is a perspective view, shown is the functioning relations and aspect of the storage compartment access panel as it relates to the storage compartments as well as the docking station of the wheel top, PC mobilizer. Another object shown is the displacement relations of the camera rotative coupling as it relates to the tabletop.

Turning to FIG. 3, shown therein is a perspective view, showing the functioning relations and aspect of the storage compartment 44 and access panel 46 as it relates to the storage compartments as well as the docking station 28 of the wheel top, PC mobilizer 10. Also shown is the tabletop 32.

Figure 4:
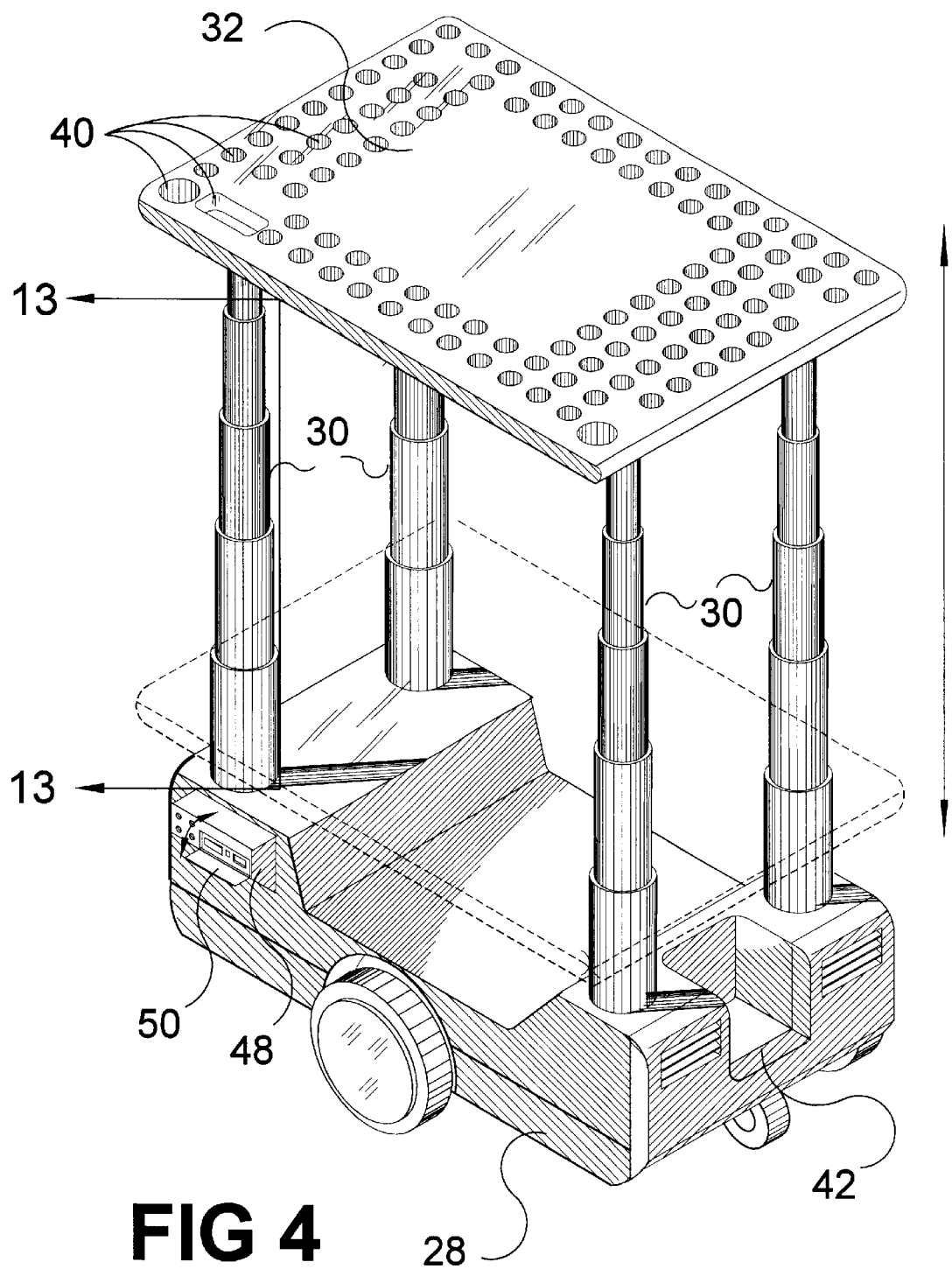
FIG. 4 is a perspective view, shown is the functioning relations of the selectively extendible table legs as they relate to the docking station as well as the tabletop. Also shown is the functioning relations of the access door on the PC interface.

Turning to FIG. 4, shown therein is a perspective view, showing the functioning relations of the selectively extendible table legs 30 as they relate to the docking station 28 as well as the tabletop 32. Also shown is the functioning relations of the access door 50 on the PC interface 48. Other features previously disclosed are also shown.

Figure 5:
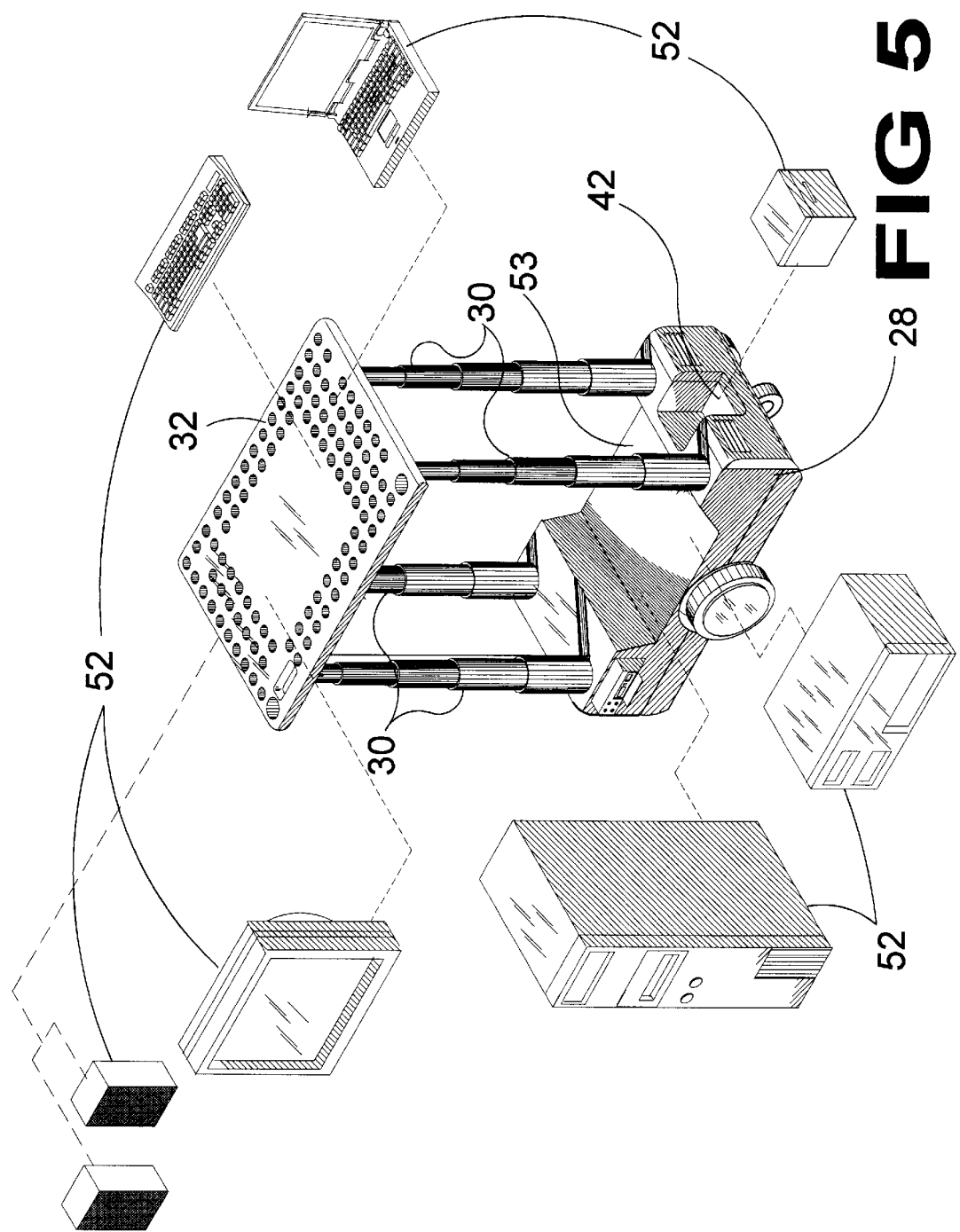
FIG. 5 is a perspective view, shown is the functioning relations of the hardware ports as they relate to various types of computer hardware device and peripherals. Also shown is the selectively extendible table legs in the fully extended position.

Turning to FIG. 5, shown therein is a perspective view, showing the functioning relations of the hardware port 53 as it relates to a plurality of various types of computer hardware devices 52 and peripherals. Also shown are the selectively extendible table legs 30 in the fully extended position. Other features previously disclosed are also shown.

Figure 6:
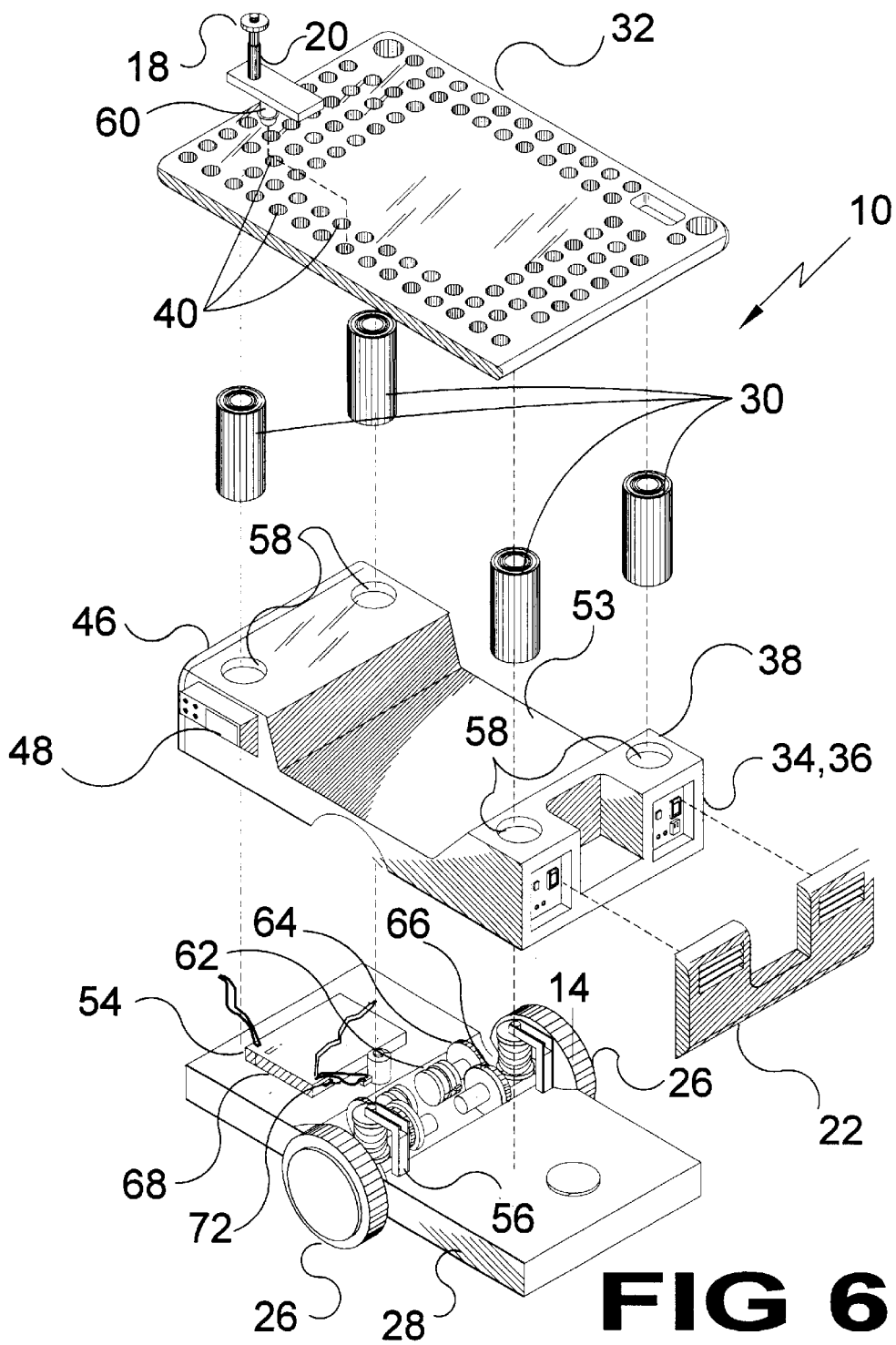
FIG. 6 is an exploded view, shown is mating relations between the components that comprise the wheel top, PC mobilizer. Also shown is the displacement relations of all the component that are housed within the mobile unit. Shown also is the displacement relations of the plurality shock absorbers as they relate to their individual wheels and drive shaft. Another object shown is the selectively extendible table legs as they relate to the upper housing's table leg recesses as well as the tabletop.

Turning to FIG. 6, shown therein is an exploded view, showing mating relations between the components that comprise the wheel top, PC mobilizer 10. The motorized workstation has a mobile base member 54, planar worksurface 32 and a plurality of extension members 30 for adjusting the height of the planar worksurface. The planar worksurface has a plurality of rotative or threaded apertures 40 wherein a stanchion or shaft 20 with means for attaching a camera thereto is mounted. Located beneath the planar worksurface are the electrical and mechanical means for controlling the tilt and pan of the camera which has an electrical connection to the personal computer for recording and or transmitting the image within the focal field of the camera. The camera stanchion 20 and the planar worksurface extension members 20 can be selectively height adjusted to suit the user. The mobile base member 54 of the motorized workstation houses the electrical and mechanical elements whereby the workstation can be instructed to move from one location to another by means of the personal computer (14 not shown). The base member 54 has an internal remotely regenerative power supply in the form of at least one battery 34, 36. There are also a number of wheels 24, 26 supporting the base member. The drive wheels are connected to a servomotor that is controlled by an integrated circuit that receives directional commands from the personal computer. The integrated circuit also controls the engaging and disengaging of the drive motor 62. Also forming an integral part of the base member is a PC interface connection panel 48 for attachment of various computer controlled components such as, mouse, keyboard, monitor, printer, camera, etc. this is basically a pass through panel to the personal computer. The wheel top, PC mobilizer is comprised of a table top 32, a plurality of selectively extendible table legs 30 having locking and retaining means, and a docking station 28. The tabletop 32 is a flat rectangular shaped structure that provides the same functioning aspect of a conventional tabletop found in industry. Also shown is the displacement relations of all the component that are housed within the mobile unit 54. Shown also is the displacement relations of the plurality of shock absorbers 56 as they relate to their individual wheels 26 and drive shaft providing independent drive assemblies for mobility. Another object shown is the selectively extendible table legs 30 as they relate to the upper housing's 38 table leg recesses 58 as well as the tabletop 32. Also shown are the telescoping camera rotator mechanism 18, the mounting post 60 which can be placed into any similarly sized mounting recesses 40, along with the PC interface 48, motor 62, drive gear 64, differential gear 66, IC (integrated circuit) housing 68, battery vent panel 22, internal battery with AC power port charging means 34, 36 and shock absorber 56. The docking station 28 is a modified rectangular shaped structure having a computer controlled mobility via wheels 24, 26 and a drive motor 62, and is also furnished with a plurality of hardware ports. The docking station is comprised of an upper housing 38, a battery vent panel 22, a storage access panel 46, a mobile unit 54 and a plurality of hardware ports. The upper housing 38 provides the housing means for several of the intricate components that help to comprise the wheel top, PC mobilizer. The upper housing houses and consists of two internal batteries 34, a PC interface 48, storage compartments, a plurality of hardware ports and table leg recesses 58. The internal batteries 34 may resemble and function like that of convention rechargeable batteries commonly found in industry. The internal batteries provide the means for powering the mobilizer CPU (central processing unit) and drive motor when the wheel top, PC mobilizer is not selectively attached to a utility power source. The PC interface 48 may be a rectangle shaped structure furnished with a plurality of variable computer connection ports. The PC interface provides the means for the user's computer to interface and communicate with the CPU of the wheel top, PC mobilizer. The PC interface is also furnished with an AC current connector that provides the means for selectively attaching the wheel top, PC mobilizer to a utility power source via a conventional extension power cord that may be found in industry. The storage compartments (not shown but see FIG. 10, Item 44) are flanged cut out furnished into the upper housing that provides a means for selectively storing intricate components of the user's choice. The hardware ports 53 are molded cut out furnished into the upper housing that provides for the means of selectively storing computer hardware items (i.e. CPU towers, printers, and other peripheral of the user's choice). The table leg recesses 58 are circular shaped recesses that provide means for coupling the extendible table legs to the upper housing. The battery vent panel 22 is a molded structure having rectangular shaped apertures therein that provides the means for ventilating the batteries that are housed within the upper housing. The storage access panel 46 is a rectangle shaped structure that provides the means for selectively retaining or obtaining components within the storage compartments.

Figure 7:
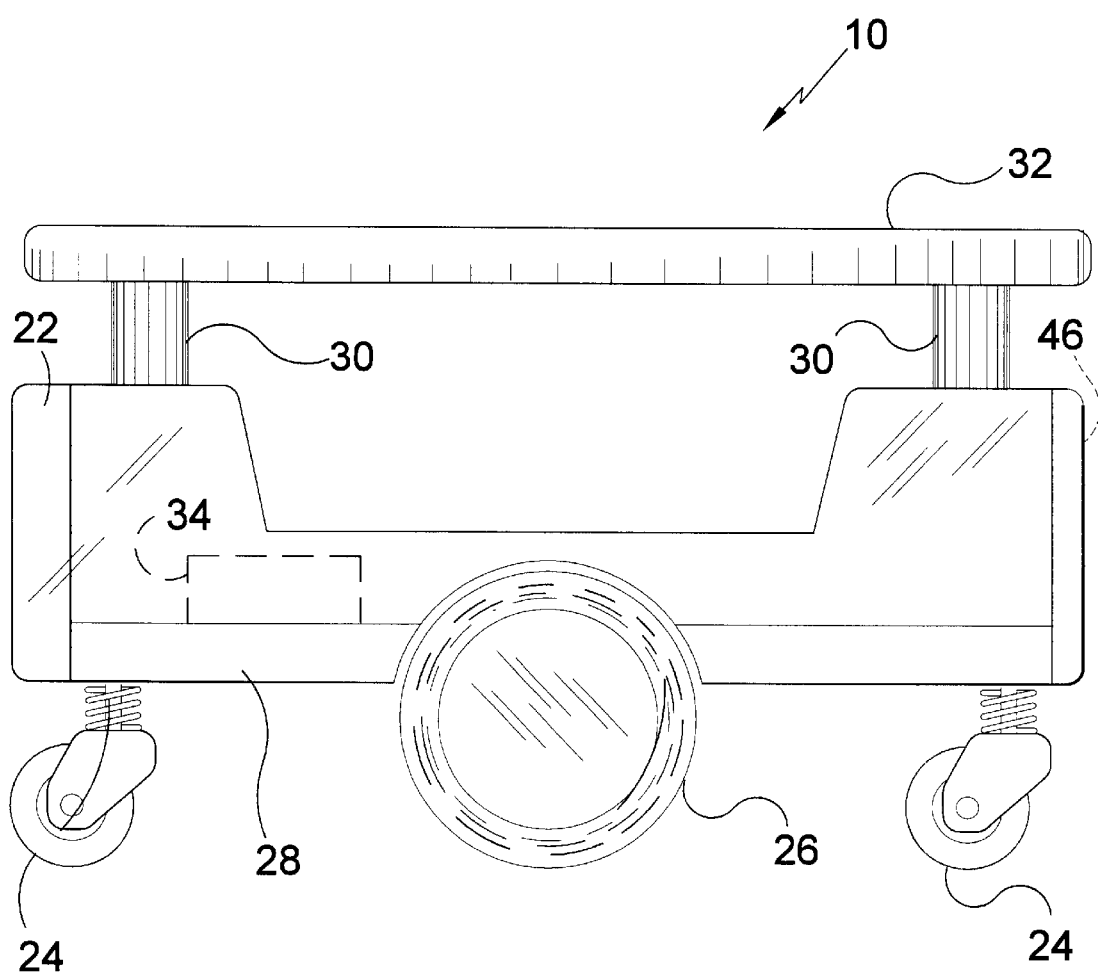
FIG. 7 is a side view, shown is the right side of the wheel top, PC mobilizer. Also shown are the displacement relations of the front and rear wheels as they relate to the docking station. Shown also is the displacement relations of the camera rotator mechanism as it relates to the tabletop and the camera rotative coupling.

Turning to FIG. 7, shown therein is a side view, showing the right side of the wheel top, PC mobilizer 10. Also shown are the displacement relations of the caster 24 and drive 26 wheels as they relate to the docking station 28. Other features previously disclosed are also shown.

Figure 8:
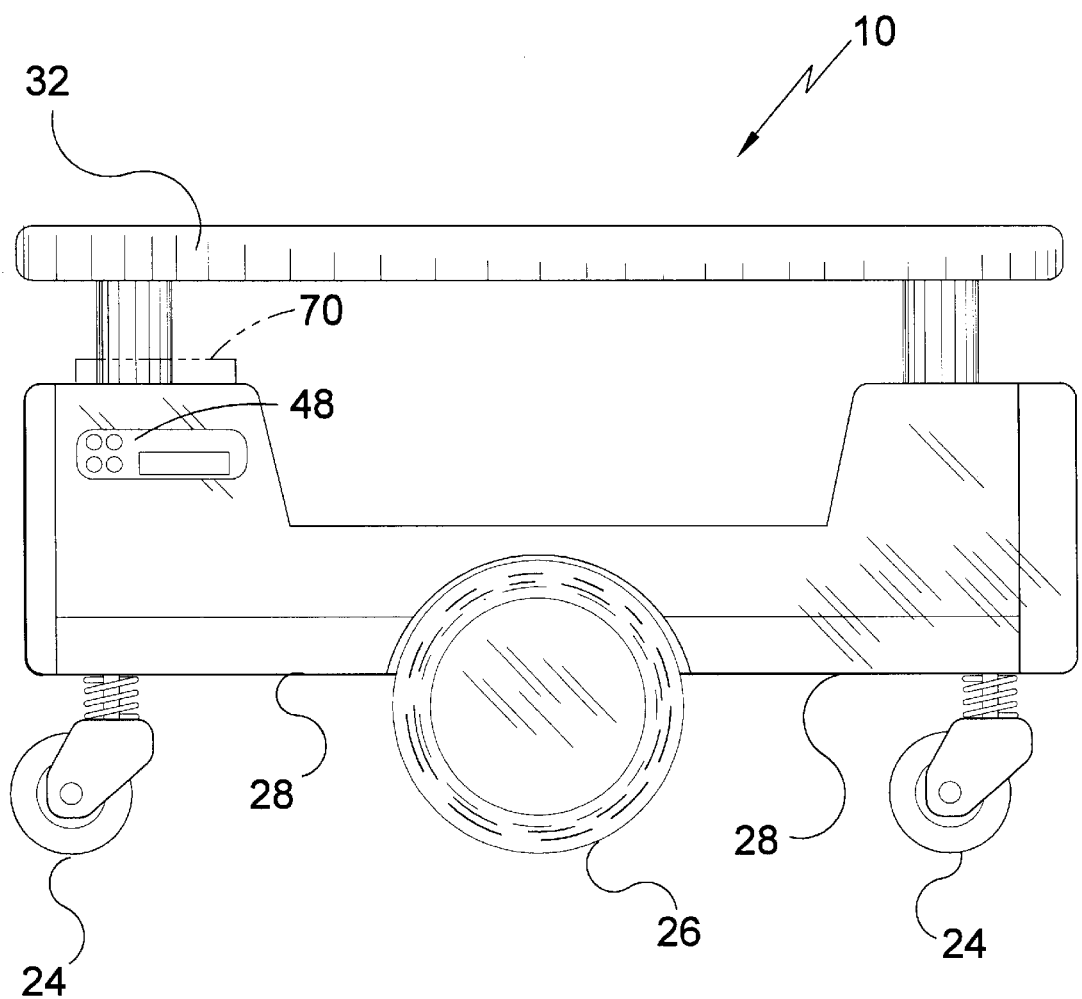
FIG. 8 is a side view, shown is the left side of the wheel top, PC mobilizer. Also shown are the displacement relations of the front and rear wheels as they relate to the docking station. Shown also is the displacement relations of the camera rotator mechanism as it relates to the tabletop and the camera rotative coupling. Another object shown is the PC interface as it relates to the docking station as well as the table top of the wheel top, PC mobilizer.

Turning to FIG. 8, shown therein is a side view, showing the left side of the wheel top, PC mobilizer 10. Also shown are the displacement relations of the caster 24 and drive 26 wheels as they relate to the docking station 28. Another object shown is the PC interface 48 as it relates to the docking station 28 as well as the table top 32 of the wheel top, PC mobilizer as well as an alternate position 70 for the PC interface.

Figure 9:
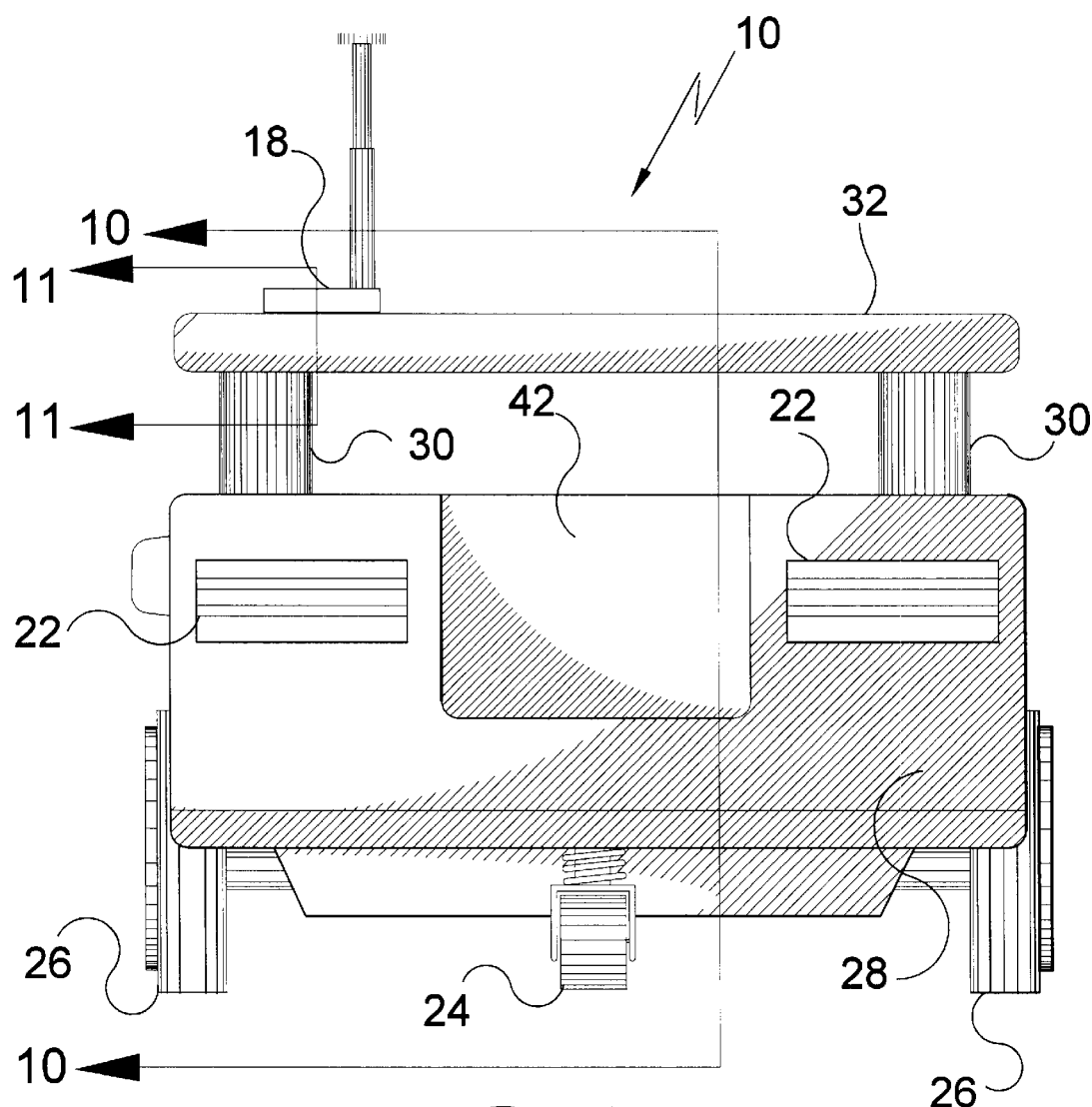
FIG. 9 is a front view, shown is the displacement relations of the battery ventilation panel as it relates to the front most hardware port. Also shown is the displacement relation of the camera rotator mechanism as it relates to the table top of the wheel top, PC mobilizer.

Turning to FIG. 9, shown therein is a front view, showing the displacement relations of the battery ventilation panel 22 as it relates to the front most hardware port. Also shown is the displacement relation of the camera rotator mechanism 18 as it relates to the table top 32 of the wheel top, PC mobilizer 10. Other elements previously disclosed are also shown.

Figure 10:
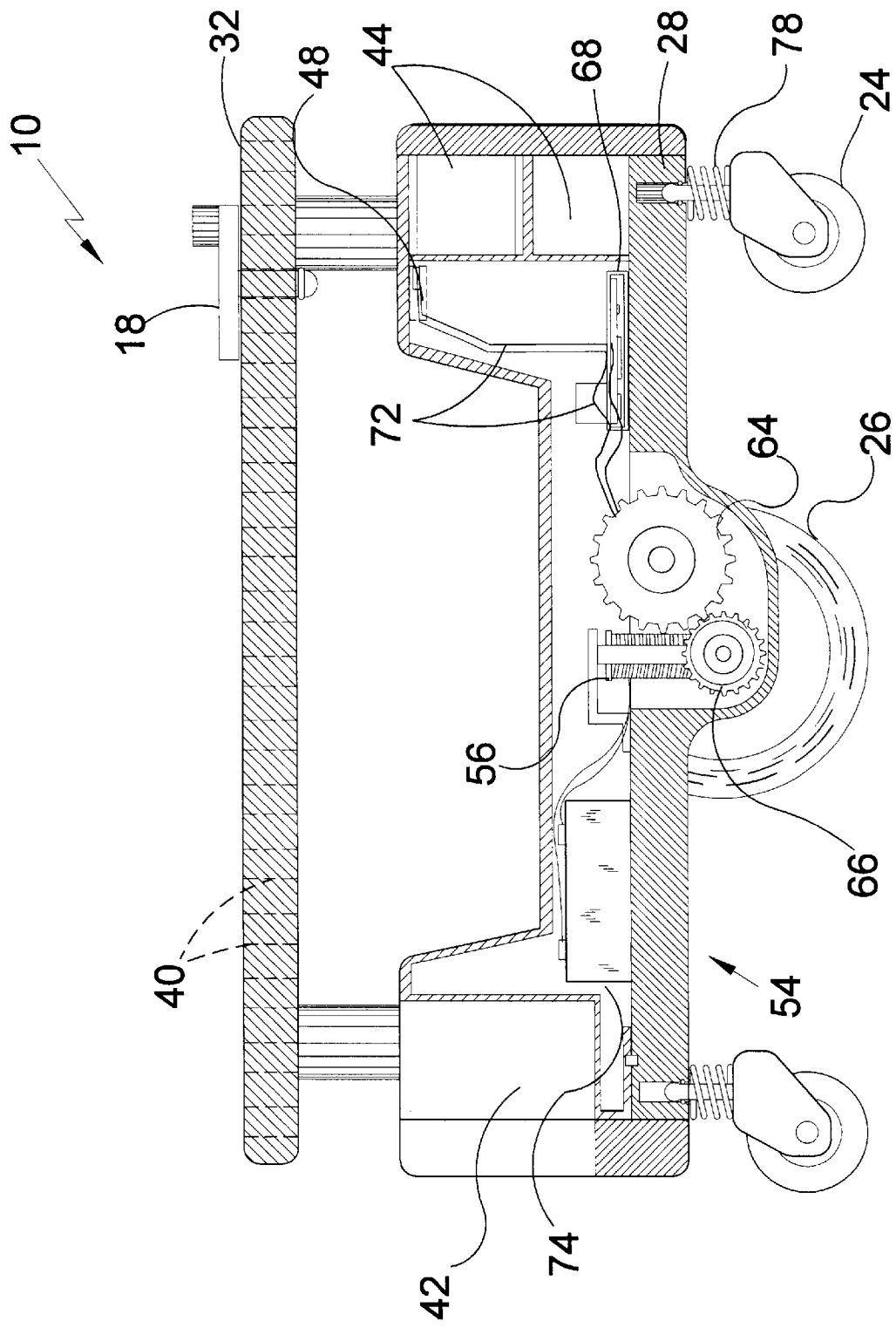
FIG. 10 is a sectional view, shown is the displacement relations of several of the components that are housed within the docking station of the wheel top, PC mobilizer. Also shown is the functioning relations of the differential gear and the drive gear as they relate to each other. Another object shown is the electrical wiring displacement and the shock absorbers as they relate to each other. Shown also is the servomotor's displacement relations as it relates to steering rod as well as the front wheels. Also shown is the displacement relations of the PC interface as it relates to the docking station.

Turning to FIG. 10, shown therein is a sectional view taken from FIG. 9, showing the displacement relations of several of the components that are housed within the docking station 28 of the wheel top, PC mobilizer 10. Also shown is the functioning relations of the differential gear 66 and the drive gear 64 as they relate to each other. Another object shown is the electrical wiring 72 and the shock absorbers 56 as they relate to each other. Also shown is the displacement relations of the PC interface 48 as it relates to the docking station 28 along with a user changeable gear 74, IC housing 68 and suspension spring 78. Other elements previously disclosed may also be shown. The mobile unit 54 is a computer controlled wheeled structure that provides the means of mobility for the wheel top, PC mobilizer 10. The mobile unit consists of a IC housing 68 with a mobilizer CPU contained therein, a clutch driven motor (not shown), a plurality of shock absorbers 56, a servo-motor (not shown), a drive gear 64, a differential gear 66, drive wheels 26, caster wheels 24 and a plurality of electrical wiring 72 and contacts. The IC housing 68 is an electrically shielded structure that houses the mobilizer CPU (not shown but see FIG. 14, Item 126). The IC housing provides the means for protecting the mobilizer CPU from inadvertent electrical or static discharge that may render the mobilizer CPU inoperable. The mobilizer CPU is a closed circuit electronic device that provides the means for monitoring the drive functions of the mobile unit as well as the circular displacement of the rotator camera drive shaft mechanism. The clutch driven motor 62 resembles that of a conventional clutch driven motor commonly found in industry. The clutch driven motor provides the means for selectively engaging the drive components within the motor to enable motion. The clutch driven motor unless activated allows for the mobile unit to move freely with no gearing. The plurality of shock absorbers 56 may be furnished to resemble and function like that of conventional shock absorbers commonly found in industry. The plurality of shock absorbers may be placed into appropriate positions, as they seem fit to absorb unwanted shock that may occur as the mobile unit propels the wheel top, PC mobilizer. The servomotor may resemble and function like that of a servomotor commonly found in industry. The servomotor works in conjunction with the drive motors of the drive wheels to provide the means for steering the wheel top, PC mobilizer. The drive gear 64, the differential gear 66 and the drive shaft 118 may be furnished to resemble and function like that of conventional gears and shafts commonly found in industry. The drive shaft, differential gear and drive gear work in conjunction with the clutch driven motor to provide the means of linear mobility for the wheel top, PC mobilizer. The electrical wiring and contacts 72 provides the means for electrically coupling several of the electronic and voltage dependant components that are housed within the wheel top, PC mobilizer.

Figure 11:
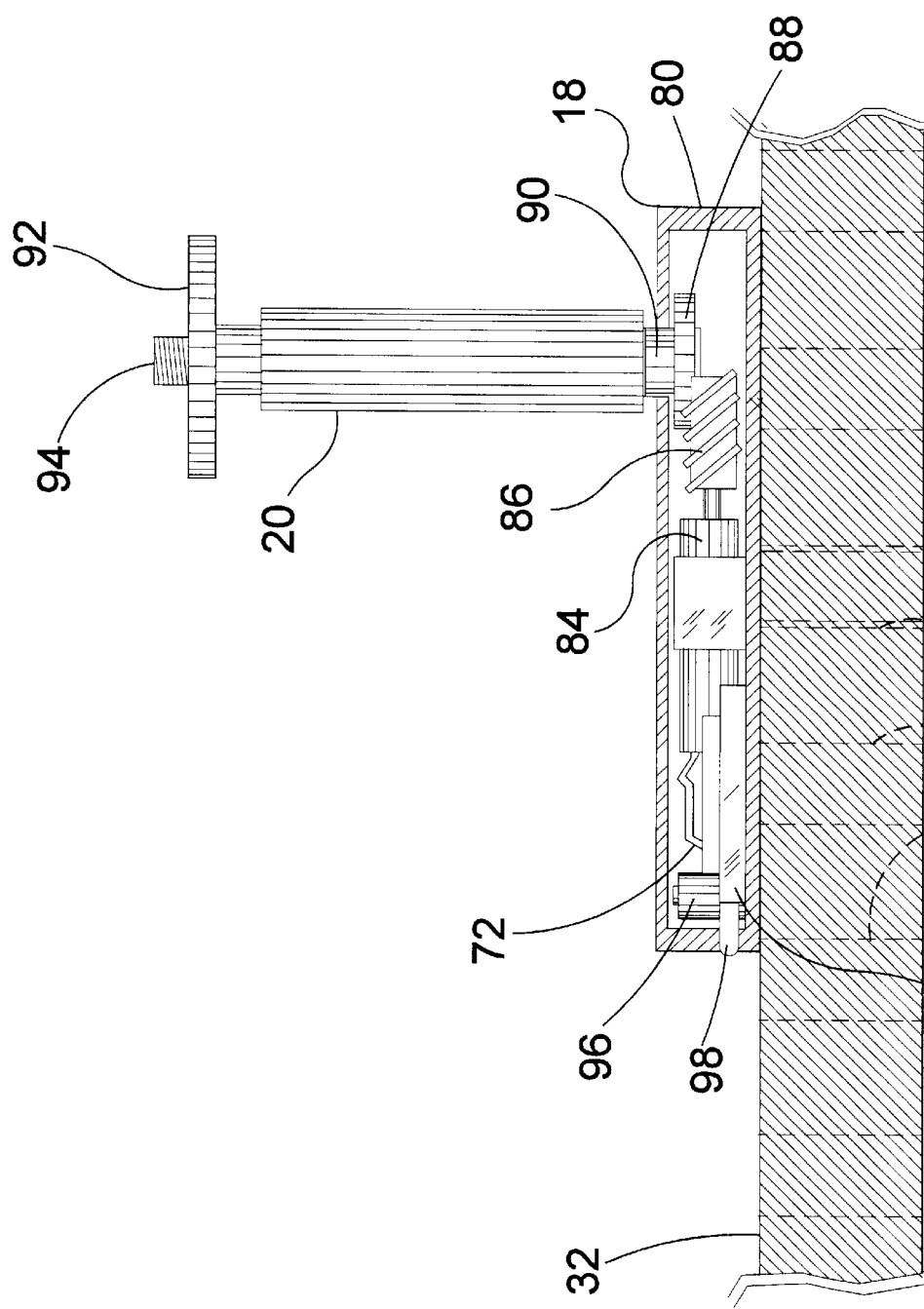
FIG. 11 is a sectional view, shown is the displacement and functioning relations of the components that comprise the camera rotator mechanism as they relate to the table top of the wheel top, PC mobilizer.

Tuning to FIG. 11, shown therein is a sectional view, showing the displacement and functioning relations of the components that comprise the camera rotator mechanism 80 as they relate to the table top 32 of the wheel top, PC mobilizer. The tabletop 32 is furnished with a camera stand 20, and a camera rotator mechanism with housing 80. The camera stand 20 is a round shaped structure having a selectively extendible leg. The camera stand provides the means of rest for a camera that is selectively attached thereto. The camera extension leg is comprised of two cylindrical shaped structures that are telescopically coupled together. The camera stand selectively extendible leg is furnished with two extension joints and extension joint retainers. The camera stand selectively extendible leg provides the user of the wheel top, PC mobilizer with the means of selectively adjusting the height of a camera that has been mounted onto the camera stand. The extension joints of the camera stand are coupled together in a telescoping manner so as to provide the means of a smooth extension as the camera stand extension leg is selectively extended. The extension joint retainers provide the means for selectively retaining the camera stand in the extended position. The camera rotator mechanism 80 of the camera rotative coupling 18 is a computer controlled unit that provides the user 12 of the wheel top, PC mobilizer 10 with the means for selectively rotating a camera that is mounted onto the telescoping camera shaft 20 and that has been coupled to the table top 32 via the camera rotative coupling mounting post 60. The camera rotator mechanism 80 is composed of a transceiver IC 82, a motor 84, a worm gear 86, a drive transfer gear 88, a drive shaft 90, and a rotative coupling post 60. The transceiver IC 82 is a closed circuit receiver and transmitter that provides the means for positioning and relaying data information about the circular displacement position of a camera mounted onto the camera stand 20 of the wheel top, PC mobilizer. The motor 84 resembles that of a small conventional drive motor that is commonly found in industry. The motor provides the means for rotating the camera mounted on the camera stand via information received from the transceiver IC 82. The worm gear 86 and the drive transfer gear 88 resemble that of a worm gear and drive component commonly found in industry, and work in conjunction with the motor 84 and the camera drive shaft 90 to deliver circular displacement to a camera that has been selectively mounted to the camera stand 20 of the wheel top, PC mobilizer. The rotative coupling post 60 is a circular shaped elongated structure that protrudes through the tabletop 32. The rotative coupling post 60 provides the means for coupling and retaining the camera stand to the tabletop 32 of the wheel top, PC mobilizer. Also shown are a camera platform 92, a camera locking screw 94, electrical wires 72, a battery 96, an antenna 98 and mounting recesses 40.

Figure 12:
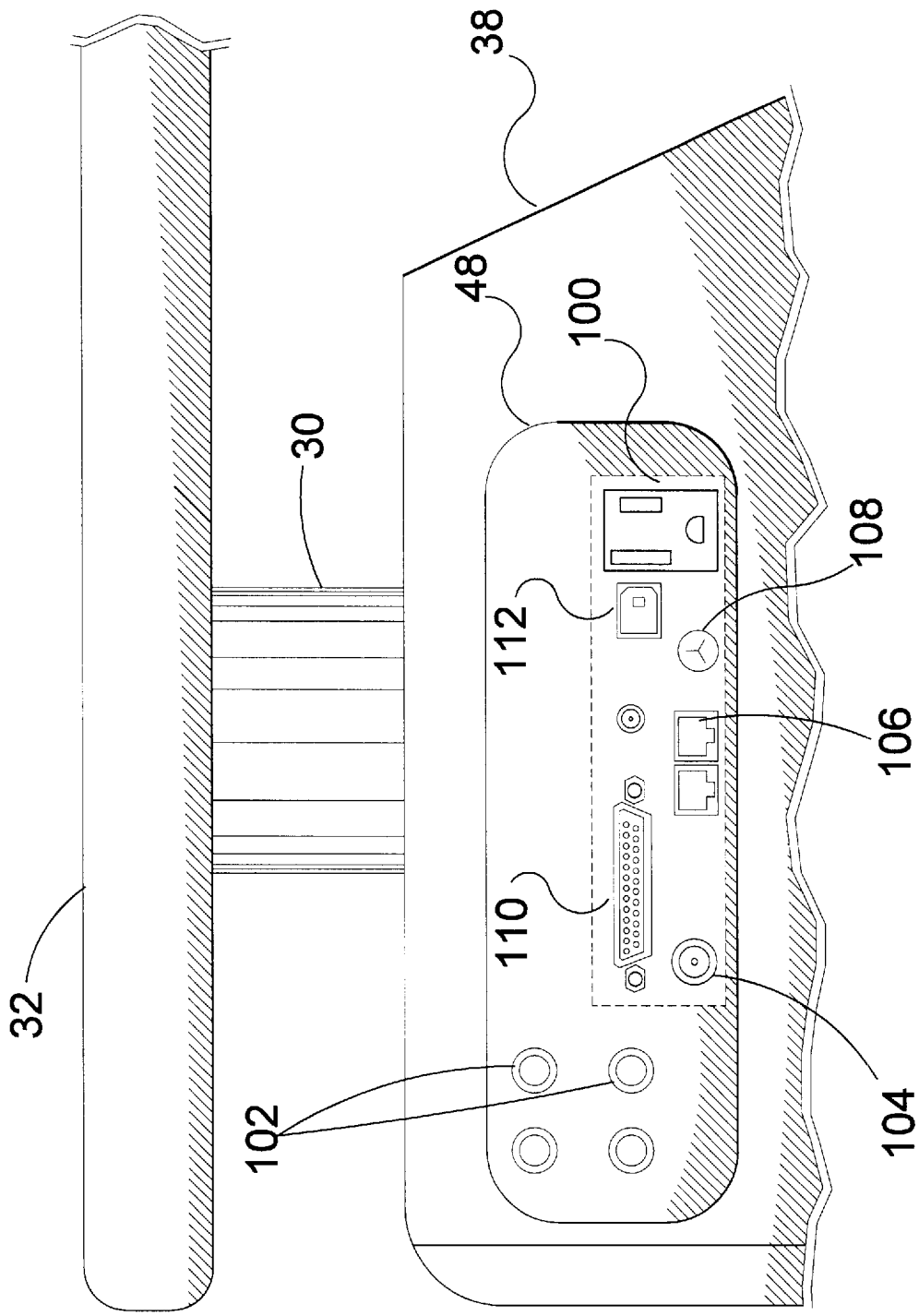
FIG. 12 is a pictorial view, shown is the displacement relations of a variety of computer connection ports as they relate to each other as well as the PC interface of the wheel top, PC mobilizer. Also shown is an AC power port as it relates to the other intricate computer connection ports that are housed within the PC interface of the wheel top, PC mobilizer.

Turning to FIG. 12, shown therein is a pictorial view, showing the displacement relations of a variety of computer connection ports as they relate to each other as well as the PC interface 48 of the wheel top, PC mobilizer. Also shown is an AC power port 100 as it relates to the other intricate computer connection ports that are housed within the PC interface of the wheel top, PC mobilizer. Another object shown is the power status LED's 102 as they relate to the PC interface 48. The plurality of computer connection ports including a cable port 104, a CAT-5 port 106, a firewire port 108, a DB-25 port 110, and a USB port 112, provide the user of the wheel top, PC mobilizer with the means to selectively interface with the mobilizer CPU via any of the computer connection ports shown (all ports internally are coupled to the mobilizer CPU and provide the same functions upon individual interface). The computer connection ports allow for the user of the wheel top, PC mobilizer to manipulate and operate the mobile functions and the camera rotative mechanism of the wheel top, PC mobilizer. Other elements previously disclosed are also shown.

Figure 13:
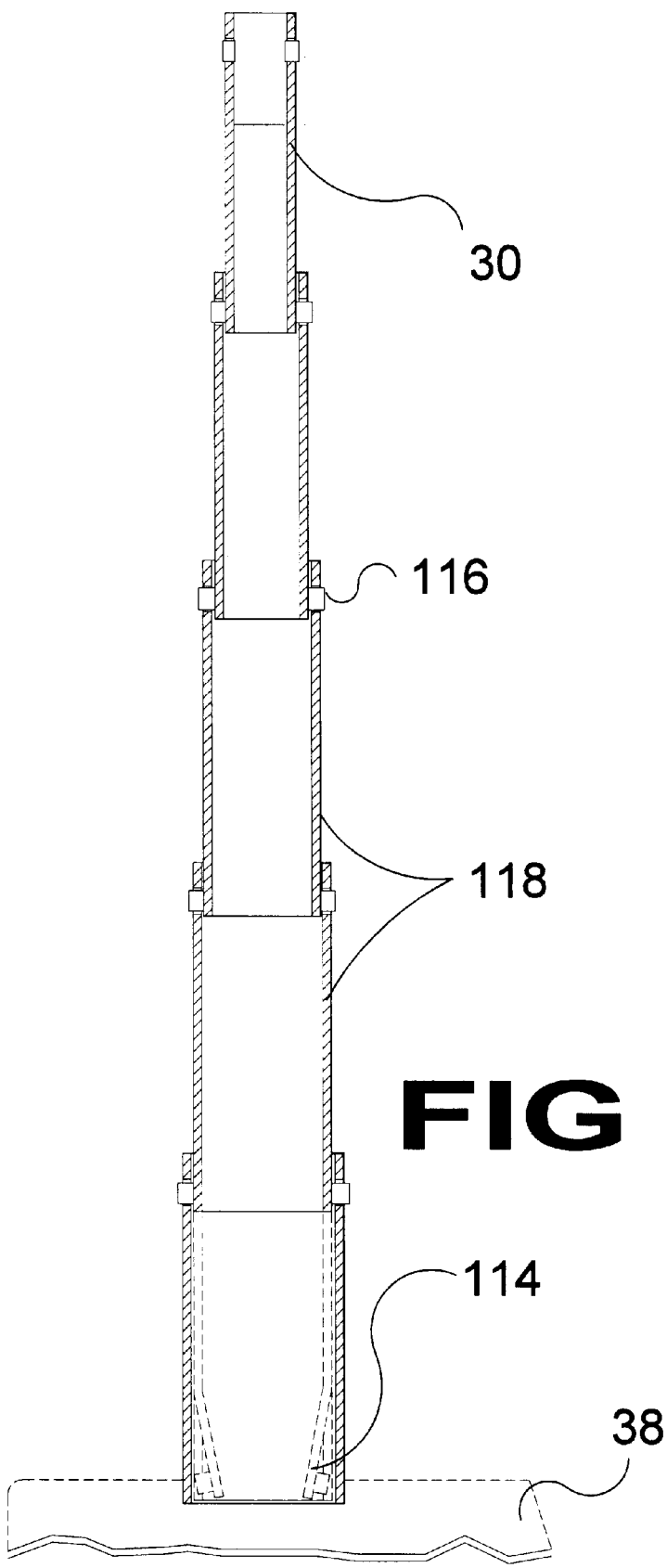
FIG. 13 is a sectional view, shown is the functioning aspect of the selectively extendible table legs. Shown also is the displacement relations of the selectively extendible table legs as they relates to the upper housing of the wheel top, PC mobilizer. Another object shown is the plurality of extension joints as they relate to each other as well as the table leg retaining members.

Turning to FIG. 13, shown therein is a sectional view, showing the functioning aspect of the selectively extendible table legs 30. Shown also is the displacement relations of the selectively extendible table legs as they relates to the upper housing 38 of the wheel top, PC mobilizer. Another object shown is the plurality of extension joints 118 as they relate to each other as well as the means for table leg retaining members 114, 116 being unlocked at 114 and locked at 116. There are four extendible table legs located at each distal corner of the tabletop bottom most side. The extendible table legs 30 are comprised of variable diameter cylindrical joint structures that are telescopically coupled together having extension joint retainers 114, 116. The extendible table legs provides the user of the wheel top, PC mobilizer with the means of selectively adjusting the height of the tabletop 32.

Figure 14:
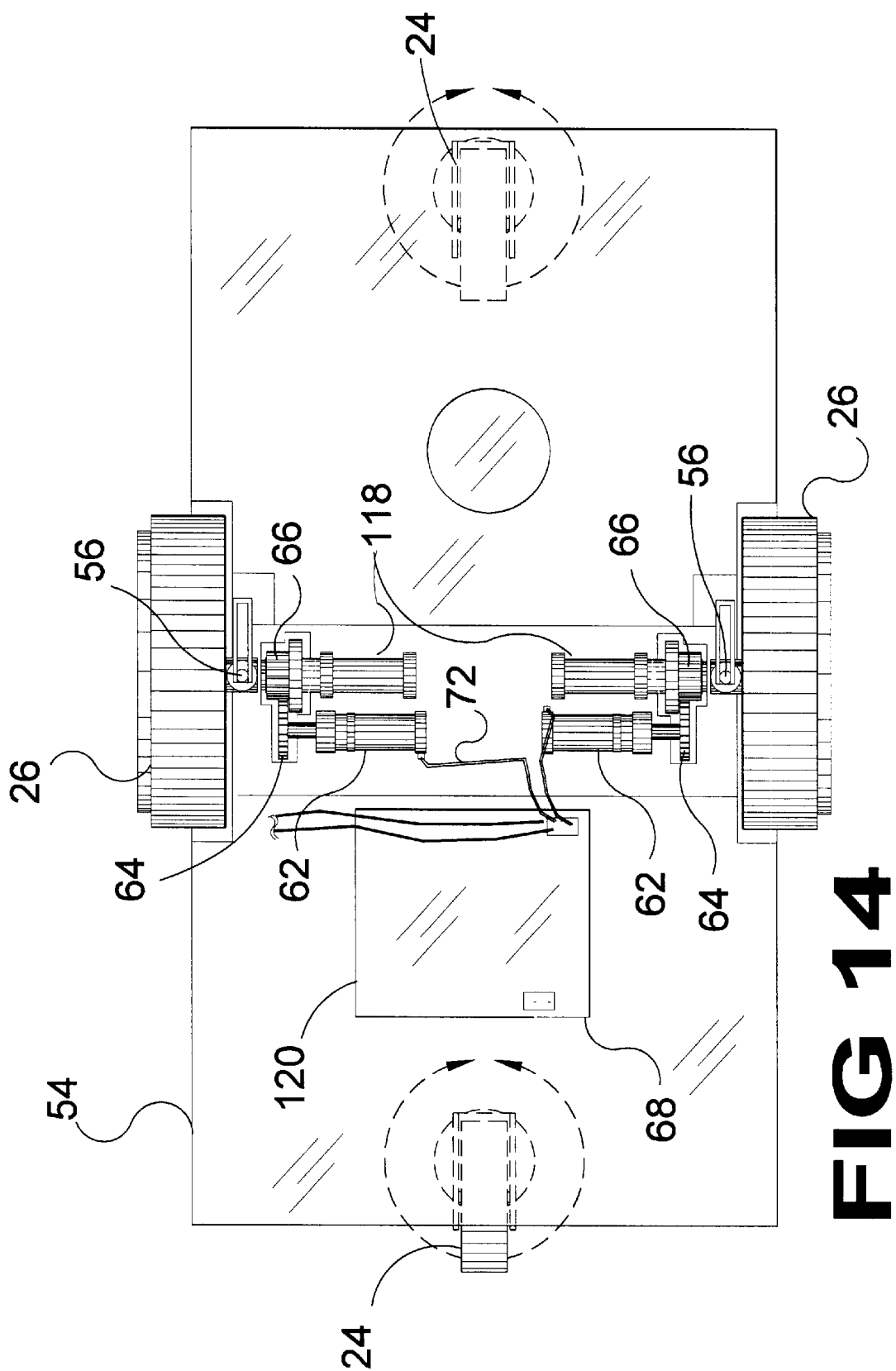
FIG. 14 is a top view, shown is the displacement relations between the intricate components that comprise the mobile unit of the wheel top, PC mobilizer. Also shown are the functioning relations and aspects of the servomotor as it relates to the front wheels of the wheel top, PC mobilizer. Another object shown is the drive motor as it relates to the drive gear, differential gear as well as the drive shaft and rear wheels of the wheel top, PC mobilizer. Shown also is the displacement relations between the rear shock absorbers as they relate to the drive shaft and rear wheels.

Turning to FIG. 14, shown therein is a top view, showing the displacement relations between the intricate components that comprise the mobile unit 54 of the wheel top, PC mobilizer. Also shown are the functioning relations and aspects of the two drive motors 62 as they relate to the front and rear caster wheels 24 of the wheel top, PC mobilizer. Also shown is the drive motor 62 as it relates to the drive gear 64 and differential gear 66 as well as the drive shaft 118 and drive wheels 26 of the wheel top, PC mobilizer. Shown also is the displacement relations between the shock absorbers 56 as they relate to the drive shaft 118 and drive wheels 26 and mobilizer CPU unit 120.

Figure 15:
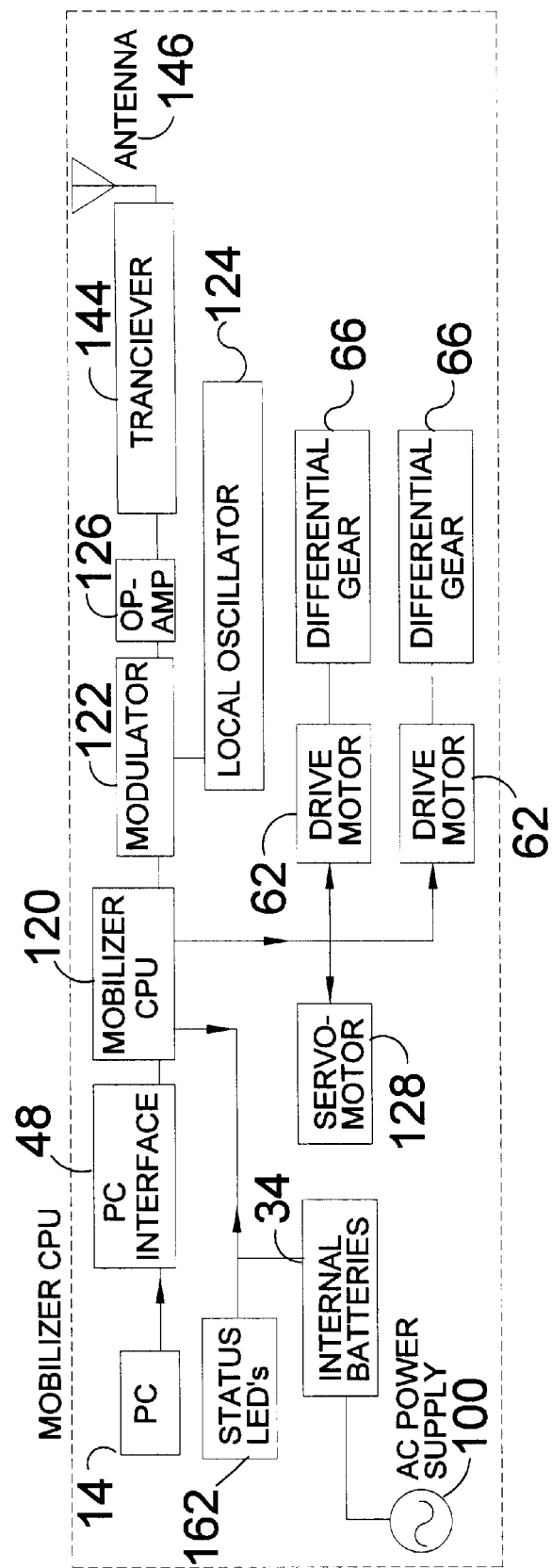
FIG. 15 is a pictorial view, shown is the schematic diagram of the mobilizer CPU. These and other objects are accomplished in accordance with the present inventions computer controlled mobilization data transformation and reception system.

Turning to FIG. 15, shown therein is a pictorial view, showing the schematic diagram of the mobilizer CPU. These and other objects are accomplished in accordance with the present invention computer controlled mobilization data transformation and reception system. In this embodiment thereof, the PC (provided by the user of the wheel top, PC mobilizer) is coupled to the wheel top, PC mobilizer via the PC interface computer connection ports ( either the DB-25, the cable port, the cat-5 port or the USB port ) which is coupled internally to the mobilizer CPU. The mobilizer CPU is furnished with a system control circuit that monitors and manipulates all of the electrical and mechanical functions and operations within the wheel top, PC mobilizer. A modulation circuit 122 is internally coupled to the mobilizer CPU that amplifies and changes the phase of a data signal generated by the mobilizer CPU. A local oscillator 124 is coupled to the modulation circuit to further change the phase of the data signal into the preferred transmission signal. An opamp 126 is internally coupled to the output of the modulation circuit and increases the amplitude and stability of the data signal before signal transmission. Coupled to the output of the opamp is a transceiver circuit 144. The transceiver is the final circuit stage before signal transmission. The transceiver output is internally coupled to an antenna 146 that has been furnished to transmit the data signal thus generated by the mobilizer CPU circuit. Also coupled to the mobilizer CPU are a plurality of drive motors 62 which are controlled by a servo mechanism circuit or servomotor 128 that receive data information from the mobilizer CPU to allow for the mobilizations and steering control of the wheel top, PC mobilizer. Yet another device coupled to the mobilizer CPU is an internal battery system 34 that deliveries power to the mobilizer CPU for all electrical functions and operations aspects.

Figure 16:
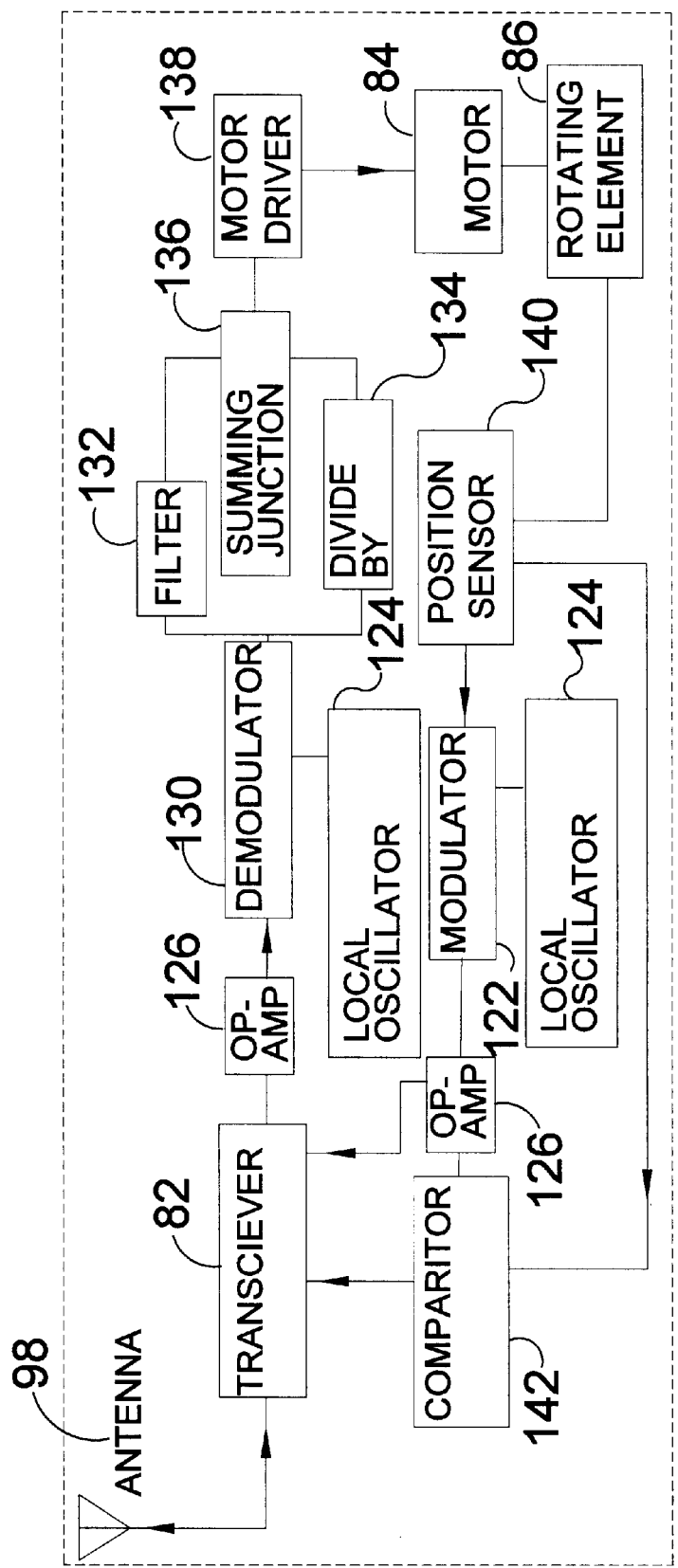
FIG. 16 is a pictorial view, shown is the schematic diagram of the camera rotator mechanism. These and other objects are accomplished in accordance with the camera rotator mechanism data signal reception and transmission system, and also the mechanical functioning aspect.

Turning to FIG. 16, shown therein is a pictorial view, showing the schematic diagram of the camera rotator mechanism. These and other objects are accomplished in accordance with the camera rotator mechanism data signal reception and transmission system, and also the mechanical functioning aspect. The antenna 98 is the input stage for all signals generated and transmitted via the mobilizer CPU transmission circuit. The antenna 98 is coupled to a signal transceiver 82. The signal transceiver 82 output is coupled to an opamp 126 that amplifies and filters the incoming data signal. A demodulator 130 is internally coupled to the output of the opamp 126 and provides and manipulates the received signal into the preferred reception signal needed to derive the information encoded in the data signal. A filter 132 is internally coupled to the demodulator 130 to further filter out any unwanted signals that may have been received during signal reception. A divide by circuit 134 is also internally coupled to the demodulator 130 that provides the means of increasing the data signals frequency. The output of the filter circuit 132 and the divide by circuit 134 are internally coupled to a summing junction. 136 circuit that combines the filtered and the frequency manipulated data signal. A motor driver circuit 138 is coupled to the output of the summing junction circuit. The motor driver circuit transforms the data signal received from the mobilizer CPU into usable data needed to drive the motor 84 of the camera rotator mechanism. The motor 84 drives a rotating element 86 that is monitored by a position sensor 140. The position sensor's 140 output is coupled to one of the inputs of a modulator circuit 122 which amplifies and manipulates the phase of the data information received from the position sensor. A local oscillator circuit 124 is also coupled to one of the inputs of the modulator 122 and further changes the phase of the data information received from the position sensor 140. An opamp 126 is coupled to the output of the modulator. The opamp increases the stability and amplitude of the data information received via the modulator and also prepares the data information for transmission via the transceiver of the camera rotator mechanism. A comparator 142 is internally coupled to the op amp, and the position sensor. The comparator 142 monitors and compares the data information that was received from the opamp and the position sensor, and then the comparator checks the data information for similarities as well as inconsistencies before the signal is transmitted. The final stage of the data information is transmission via the transceiver 82 and the antenna 98.

What is claimed to be new and desired to be protected by Letters Patent is set forth in the appended claims.

I claim:

1. An apparatus for a mobile computer controlled work station having a camera mounted thereon, comprising:
   a) an upper planar work surface, said work surface having a plurality of apertures therein, said apertures being spaced about;
   b) a camera rotative coupling disposed in said apertures of said upper work surface, said camera rotative coupling for receiving the camera;
   c) means for rotating said camera rotative coupling disposed thereon;
   d) a lower mobile unit, said unit having a plurality of drive wheels thereon whereby movement is provided;
   e) means for connecting said upper planar work surface to said lower mobile unit;
   f) means for controlling said plurality of drive wheels; and,
   g) a first computer for controlling said means for rotating said camera rotative coupling and said means for controlling said plurality of drive wheels.

2. The apparatus of claim 1, wherein said camera rotative coupling further comprises a housing, said housing having an elongated downwardly extending post disposed thereon, said post for insertion into said plurality of apertures on said upper planar work surface.

3. The apparatus of claim 2, further comprising an elongated upwardly extending camera shaft disposed on said housing, said shaft having means for adjusting the shaft length and means for attaching the camera thereto, said shaft having a drive shaft attached thereto.

4. The apparatus of claim 3, wherein said means for adjusting the shaft length further comprises a pair of telescoping sections.

5. The apparatus of claim 4, wherein said camera rotative coupling further comprises a camera platform and a camera locking screw.

6. The apparatus of claim 5, wherein said means for rotating said camera rotative coupling further comprises an electrical motor, a rotatable means for contacting said drive shaft, and an integrated circuit transceiver which provides means for positioning the camera, and an antenna means connected to said transceiver whereby signals are received and transmitted via a mobilizer central processing circuit disposed in said lower mobile unit.

7. The apparatus of claim 6, wherein said lower mobile unit further comprises a docking station having an upper housing disposed thereon, said upper housing providing an enclosure therefor.

8. The apparatus of claim 7, wherein said docking station further comprises a front and a rear caster wheel, and a pair of drive wheels having one drive wheel disposed on each of its sides.

9. The apparatus of claim 8, wherein said docking station further comprises a plurality of storage compartments integrally molded therein, a hardware port for receiving computer hardware integrally molded therein, a plurality of recesses for receiving said means for connecting said upper planar work surface to said docking station of said lower mobile unit, means for a PC interface, said means for controlling said plurality of drive wheels, and a source of power.

10. The apparatus of claim 9, wherein said means for connecting said upper planar surface to said lower mobile unit further comprises a plurality of selectively extendable legs disposed on the four corners thereof.

11. The apparatus of claim 10, wherein said legs further comprise a plurality of extension joints, said extension joints being telescopically coupled to each other, said extension joints further comprising table leg retaining members whereby said extension joints can be secured to each other.

12. The apparatus of claim 11, wherein said means for controlling said plurality of drive wheels further comprises a plurality of drive motors, each of said drive motors comprising a drive axle, a differential gear, a drive gear, an integrated circuit housing having a central processing unit therein, a transceiver for transmitting signals to said antenna means of said camera rotative coupling, and an antenna.

13. The apparatus of claim 12, wherein said means for controlling said plurality of drive wheels further comprises servomotor, whereby the direction and speed of said drive wheels are controlled.

14. The apparatus of claim 13, wherein said first computer further comprises a first means for connection to said means for a PC interface, said means for a PC interface further comprises a second means for connection to said servomotor, whereby said servomotor is controlled.

15. The apparatus of claim 14, wherein said transceiver controls said means for rotating said camera by transmitting a signal to said antenna means of said camera rotative coupling.

* * * * *